Aug. 19, 1924.
W. N. BOOTH
DEMOUNTABLE WHEEL
Filed June 29, 1917
1,505,243
2 Sheets-Sheet 2
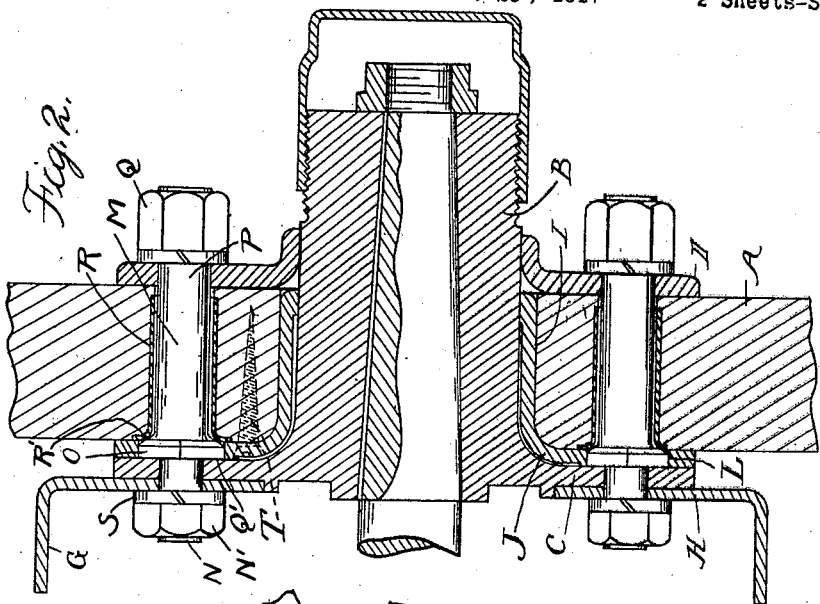
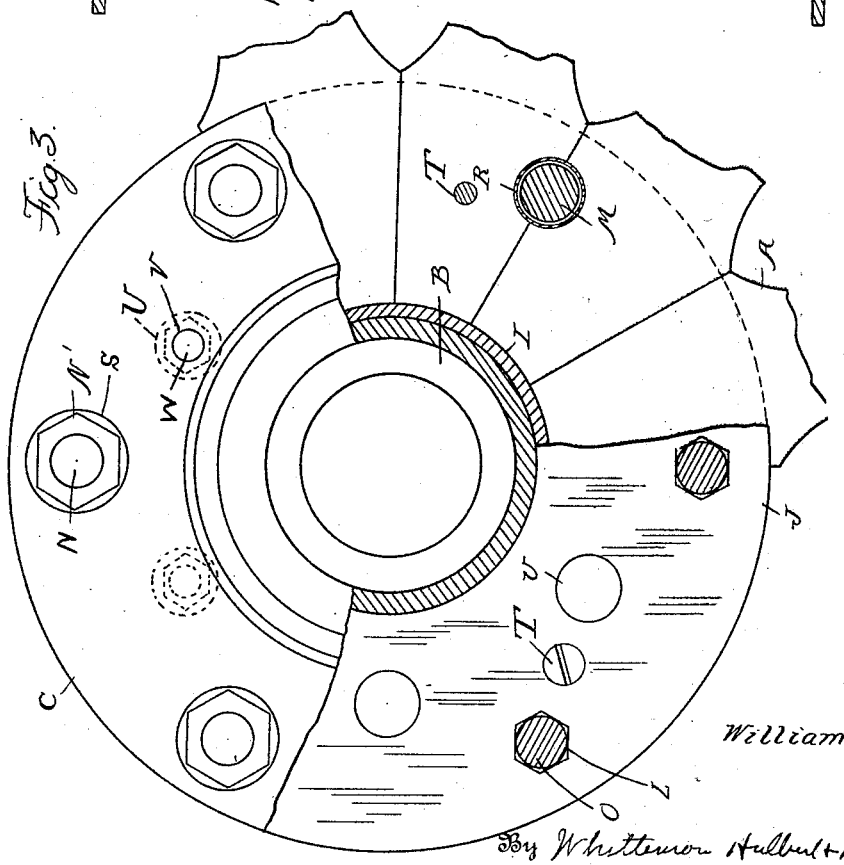
Inventor
William N. Booth
By Whittemore Hulbert & Whittemore
Attorneys Patented Aug. 19, 1924.

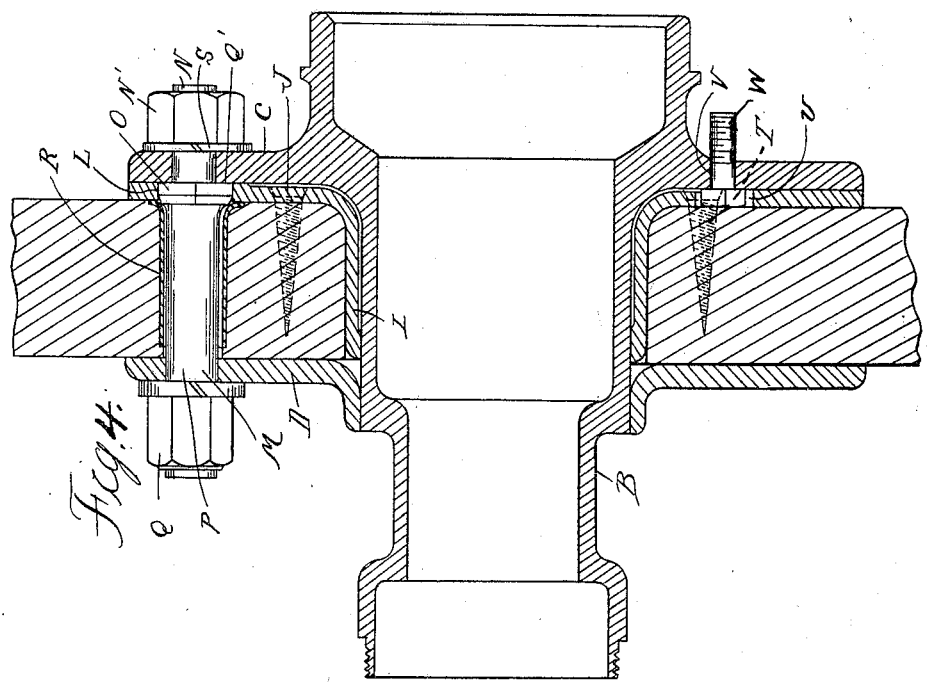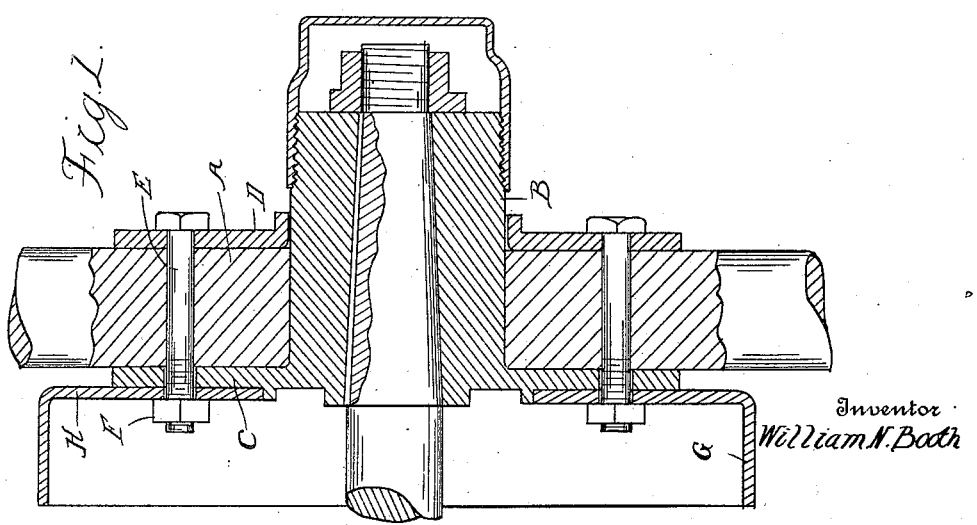

1,505,243

UNITED STATES PATENT OFFICE.

WILLIAM N. BOOTH, OF DETROIT, MICHIGAN.

DEMOUNTABLE WHEEL.

Application filed June 29, 1917. Serial No. 177,687.

*To all whom it may concern:*

Be it known that I, WILLIAM N. BOOTH, a citizen of the United States of America, residing at Detroit, in the county of Wayne and State of Michigan, have invented certain new and useful Improvements in Demountable Wheels, of which the following is a specification, reference being had therein to the accompanying drawings.

The invention relates to vehicle wheels of the non-demountable type, and it is the object of the invention to provide means for converting such wheels into the demountable type. To this end the invention comprises the novel construction of attachment and replacement elements and the method of assembling the same as hereinafter set forth.

In the drawings:

Figure 1 is a cross-section through a non-demountable wheel;

Figure 2 is a similar section showing the same converted into a demountable wheel;

Figure 3 is a side elevation partly in section of the construction shown in Figure 4;

Figure 4 is a view similar to Figure 2 showing a forward wheel construction.

My invention is applicable to various types of non-demountable wheels, but as specifically shown is designed for use in connection with the "Ford" wheel. As shown in Figure 1, this wheel comprises wooden spokes A, the hub B having an integral spoke-clamping flange C on its inner side, and an annular flange D on its outer side with clamping bolts E passing through said flanges and spokes and secured by nuts F. Where the wheel is used for the rear or driving wheel a brake-drum G is secured to the hub by the same bolts E passing through apertures in the inwardly-extending flange H.

My improvement for converting such a wheel to a demountable type comprises a bushing I having a cylindrical portion for sleeving over the hub and an outwardly-extending flange portion J for lying adjacent to the inner faces of the spokes. This flange is provided with a series of apertures L which register with the positions of the bolts E and are preferably of a polygonal form. M are a series of studs forming replacements for the bolts E and which are formed with threaded inner end portions N, polygonal head portions O adjacent thereto and having shoulders Q' for bearing against the outer face of the hub flange C, and outwardly-extending portions P for passing through the spokes threaded at their outer ends for engaging clamping nuts Q. There are also preferably provided bushings or thimbles R of a size to loosely fit about the portions P of the studs M.

To convert the wheel as shown in Figure 1 into the construction shown in Figure 2, the wheel and hub are removed from the axle and the hub is then detached by removing the bolts E. The central opening is then enlarged by cutting away the spokes sufficiently to receive the bushing I, and the holes for the bolts E are also enlarged to receive the thimbles R which are inserted therein from the inner side of the spokes. The bushing I is then placed upon the hub and the studs M are secured to the flange C by inserting the threaded portions N through the apertures in said flange and placing the polygonal portion O in the polygonal apertures L of the flange J, nuts N' being engaged with the threaded portions N to clamp the studs. The spoke portion of the wheel may then be engaged with the hub, inserting the ends of the studs M into the thimbles R, which latter are slightly flared at their inner ends, as indicated at R' for receiving said studs, while the nuts N' are slightly loosened to permit the studs to align themselves with said thimbles. The annular clamping plate D is next placed in position and the nuts Q engaged with the studs and tightened, after which the nuts N' may be also tightened. To hold the latter nuts from disengagement lock washers S are preferably inserted between the same and flange C, and where the brake-drum G is secured to the wheel the flange H thereof is clamped by the same nuts N', as shown in Figure 2.

After the parts are assembled as just described, the wheel may at any time be demounted by merely removing the nuts Q and slipping the spoked portion, including the member I, off from the hub B. In the same manner the wheel may be mounted by sliding the member I upon the hub, placing the annular flange D in position and engaging the nuts Q and tightening the same.

To secure the member I from accidental displacement it is preferably attached to the spokes by a plurality of wood screws T passing through the flange J. Also this flange J is provided with a series of apertures U intermediate the apertures L, and which are adapted to register with apertures V in the flange C, as shown in Figures 3 and 4. These apertures V in the normal construction of wheel are used for the passage of wood screws which secure the cyclometer gear in position, but with the converted construction I dispense with these wood screws and use in place thereof headed bolts W. The heads of these bolts are on the outer side of the flange C and will engage with the apertures U in the flange J, while the inwardly-projecting threaded ends of the bolts may be used for securing the cyclometer gear.

The combination of the replacement element is simple and inexpensive, and the operation of converting the wheel is also one which can be quickly performed. The thimbles R protect the wood of the spokes from the abrasive action of the screws in repeated mountings and demountings and thus prevent injury to the wheel.

What I claim as my invention is:

1. The combination with the hub of a vehicle wheel of the non-demountable type, said hub having a spoke-clamping flange and a detachable spoke-clamping flange adapted to be bolted thereto, of a series of replacement studs having threaded inner and outer ends, the former engaging the bolt apertures in the hub flange and provided with a shoulder for abutting against said flange, nuts for clamping said studs to said flange, nuts for engaging the outer ends of the studs and clamping the detachable flange to the spokes, a bushing for the wheel adapted to sleeve upon the hub, and means on said bushing engaging said studs to lock the same from rotation.

2. The combination with the hub of a vehicle wheel of the non-demountable type, said hub having a spoke flange, a spoke section and a detachable clamping flange, of means for securing the spokes to said spoke flange including a series of replacement studs having shouldered bearings for engaging said spoke flange and adapted to be secured thereto, means adjacent to said spoke flange engaging said studs for locking the same from rotation, and thimbles for engaging apertures through the spokes in alignment with said studs and loosely fitting the latter.

3. The combination with the hub of a vehicle wheel of the non-demountable type, said hub having an integral spoke-clamping flange, a spoke section and a demountable clamping flange, of a bushing for engaging the spoke section having an outwardly extending flange on the inner sides of the spokes, replacement studs having shouldered bearings for engaging the integral spoke clamping flange and portions non-revolubly engaging apertures in the bushing flange, nuts for clamping the inner ends of said studs to the integral spoke clamping flange, and nuts for engaging the outer ends of said studs to clamp said demountable clamping flange.

4. The combination with the hub of a vehicle wheel of the non-demountable type, said hub having an apertured spoke flange, a spoke section and a detachable clamping flange, of a bushing engaging said spoke section and adapted to sleeve over said hub, a flange extending outward from said bushing and provided with polygonal apertures therein, replacement studs having polygonal shouldered portions for engaging the polygonal apertures, inwardly extending portions for engaging the apertures in said spoke flange and outwardly extending portions, said studs having inner and outer threaded portions, and nuts for engaging the inner and outer threaded portions of said studs.

5. The combination with the hub of a vehicle wheel of the non-demountable type, said hub having an integral apertured spoke clamping flange, a spoke section and a detachable clamping flange, of a bushing for engaging the spoke section and adapted to sleeve over said hub, a flange extending outward from said bushing lying adjacent to said integral apertured spoke clamping flange and provided with polygonal apertures for registration with the apertures in said integral spoke clamping flange, replacement studs having shouldered polygonal portions for engaging said polygonal apertures, threaded inward portions for passing through the apertures in said integral spoke-clamping flange, and threaded outwardly extending portions, nuts for engaging the inner and outer threaded portions of said studs, and thimbles engaging apertures in the spokes through which said studs are passed.

6. The combination with the hub of a vehicle wheel of the non-demountable type, said hub having an integral spoke clamping flange, a detachable clamping flange and a spoke section intermediate said flanges apertured for the passage of clamping bolts, of a bushing for engaging said spoke section having an outwardly extending flange apertured in alignment with the apertures in said spoke section and also apertured intermediate said first-mentioned apertures, studs for engaging said integral hub flange and the apertures in said bushing flange in alignment therewith, and headed bolts passing through apertures in said integral hub flange with the heads thereof in the intermediate apertures in said bushing flange.

In testimony whereof I affix my signature.

WILLIAM N. BOOTH.